(12) United States Patent
Holt (10) Patent No.: US 12,324,422 B2
(45) Date of Patent: Jun. 10, 2025

(54) DEGASSING DEVICE AND AN AQUACULTURE SYSTEM WITH SUCH A DEGASSING DEVICE

(71) Applicant: TD HOLT HOLDING APS, Egtved (DK)

(72) Inventor: Thomas Holt, Egtved (DK)

(73) Assignee: TD HOLT HOLDING APS, Egtved (DK)

( * ) Notice: Subject to any disclaimer, the term of this patent is extended or adjusted under 35 U.S.C. 154(b) by 127 days.

(21) Appl. No.: 18/548,128

(22) PCT Filed: Mar. 1, 2022

(86) PCT No.: PCT/EP2022/055104
§ 371 (c)(1),
(2) Date: Aug. 28, 2023

(87) PCT Pub. No.: WO2022/184691
PCT Pub. Date: Sep. 9, 2022

(65) Prior Publication Data
US 2024/0138381 A1    May 2, 2024

(30) Foreign Application Priority Data

Mar. 3, 2021  (DK) .......................... PA 2021 00222

(51) Int. Cl.
*A01K 63/04*  (2006.01)
(52) U.S. Cl.
CPC ................................. *A01K 63/042* (2013.01)

(58) Field of Classification Search
CPC ....... A01K 63/042; B01D 19/00; B01D 33/00
See application file for complete search history.

(56) References Cited

U.S. PATENT DOCUMENTS

| 4,468,358 A | 8/1984 | Haegeman |
| 2008/0217225 A1* | 9/2008 | Allis .................... A01K 63/047 261/37 |
| 2016/0317989 A1* | 11/2016 | Nagler .................. B01F 33/813 |

FOREIGN PATENT DOCUMENTS

| CN | 203262047 U | 11/2013 |
| CN | 103583432 A | 2/2014 |
| DE | 299 10 209 U1 | 11/1999 |
| DE | 201 15 163 U1 | 11/2001 |
| DE | 20312540 U1 | 2/2004 |
| JP | H06 253703 A | 9/1994 |
| KR | 10-2074613 B1 | 2/2020 |
| RU | 2 742 558 C1 | 2/2021 |

OTHER PUBLICATIONS

Machine Translation of DE-20115163-U1 (application cited on ISR and Written Opinion of the ISA), Kronawitter, A., Nov. 29, 2001 (Year: 2001).*

(Continued)

*Primary Examiner* — Kimberly S Berona
*Assistant Examiner* — Katherine June Walter
(74) *Attorney, Agent, or Firm* — Francis J. Maguire; WARE FRESSOLA MAGUIRE & BARBER LLP (57) ABSTRACT

The present invention relates to a degassing device and an aquaculture system with such a degassing device. The degassing device includes perforated rotating blades.

10 Claims, 8 Drawing Sheets

(56) References Cited

OTHER PUBLICATIONS

Machine Translation of RU-2742558-C1 (cited on ISR and Written Opinion of the ISA), Breev, Y.V., Feb. 8, 2021 (Year: 2021).*
International Search Report (ISR), International Application No. PCT/EP2022/055104, mailed Jun. 28, 2022, 4 pages.
Written Opinion of the International Searching Authority (ISA/EP), International Application No. PCT/EP2022/055104, mailed Jun. 28, 2022, 6 pages.
Search Report—Patent, Application No. PA 2021 00222, Danish Patent and Trademark Office, completed Aug. 26, 2021, 3 pages.
Bibliographic data: CN203262047(U)—Nov. 6, 2013, including English Abstract, Espacenet, 1 page.
Machine translation of description in CN203262047U, European Patent Office, 3 pages.
Machine translation of description in DE20312540U1, European Patent Office, 14 pages.
Bibliographic data including English abstract for Chinese patent application publication No. CN103583432A, 1 page.
Bibliographic data including English abstract for Korean application publication No. KR102074613B1, 1 page.
English abstract for German application publication No. DE 299 10 209 U1, 1 page.
Search Report for Application No. 202302611 by Patent Office of Chile included in first office action dated Aug. 11, 2024, 12 pages.

* cited by examiner

DEGASSING DEVICE AND AN AQUACULTURE SYSTEM WITH SUCH A DEGASSING DEVICE

TECHNICAL FIELD OF THE INVENTION

The present invention relates to the field of aquaculture and more particularly for carbon dioxide control of the water in recirculated aquaculture systems.

BACKGROUND OF THE INVENTION

Pumps may be used to recirculate water in aquatic farms, such as recirculating aquaculture systems, in which fish and other aquatic life are raised. Recirculating aquaculture systems generally include one or more tanks (e.g., culture tank) or ponds to hold the fish and/or other aquatic life, one or more water inlets leading water into the tanks or ponds, and one or more water outlets leading water out of the tanks or ponds. The water outlets are typically in communication with an inlet of a variable speed pump. The variable speed pump generally propels water through a filter and back into the tank through the water inlets. In conventional recirculating aquaculture systems, there are several parameters, such as oxygen and carbon dioxide concentrations, that are typically frequently monitored by the farmers in order to secure that the fish and/or other aquatic life can survive therein. With regards to e.g., fish, the oxygen level must not be too low for the fish to metabolize the feed, and the carbon dioxide concentration must not reach a toxic level. Therefore, oxygen is added to the water and carbon dioxide is removed therefrom by the aid of degassers. However, the carbon dioxide degassers are expensive and inefficient.

RU2742558 discloses an installation for the degassing of various liquid media, including suspensions and emulsions under vacuum, and which can be used in mining, food, chemical and other industries. Design features of the degasser are obtained by forming and investigating a mathematical model, by means of which the profile of the liquid velocity at the output of the degassing degasifier inlet is reproduced considering the diameter of the degasser cylindrical housing.

DESCRIPTION OF THE INVENTION

It is an object of the present invention to overcome the above-mentioned problems. The present invention provides a solution that is very efficient in removing carbon dioxide from the water and may be operated without the use of electrical power.

A first aspect relates to a degassing device adapted for releasing carbon dioxide from a stream of water, said device comprising:
  a tubular structure comprising a water inlet, and a water outlet;
  an elongate shaft holding a plurality of blades twisted about a central longitudinal axis of said shaft; said shaft positioned within said tubular structure and between said inlet and said outlet;
  a suspension adapted for supporting said shaft within said tubular structure;
  wherein said shaft is rotatably connected to said suspension;
  wherein each of said blades comprises a central part and two lateral parts, each flanking said central part; wherein a major part of said central part is substantially free from perforations, and wherein said lateral parts are perforated with multiple perforations, said perforations preferably evenly distributed over a major part of said lateral parts.

The function of the tubular structure is manyfold. One function is to lead received water towards and away from the blades. Another function is to aid in the process of stirring and agitating the water to force the carbon dioxide out therefrom. The tubular structure may preferably comprise perforated walls, preferably with multiple perforations, such as covering 10-90% of the wall surface. Preferably, the perforations are evenly distributed over a major part of said tubular structure. Each perforation preferably has a diameter within the range of 2-20 mm, more preferably within the range of 5-15 mm, and even more preferably within the range of 5-10 mm. Such perforations perform the best stirring and agitation of the water.

Furthermore, a further function of the tubular structure may be to support the suspension. In some embodiments, the suspension may even be a part of the tubular structure.

The movable member of the degassing device is the elongate shaft holding a plurality of blades twisted about a central longitudinal axis of said shaft. Many different embodiments may be suitable, but a preferred one is where a blade is twisted 15-90 degrees around the shaft, preferably twisted 30-75 degrees around the shaft, and more preferably about 45 degrees around the shaft. When the water hits the blades, the blades are forced to rotate due to the shape and twist of the blades and the shaft's position in the suspension. The shaft and blades are obviously positioned within the tubular structure and between said inlet and said outlet. In order to avoid that the rotation of the blades is counteracted by water escaping through the blades, a major part of a blade central part is substantially free from perforations, preferably without perforations, e.g., less than 10%, preferably less than 5%, of the blade central part constitutes perforations. On the other hand, two blade lateral parts, each flanking said blade central part, are perforated with multiple perforations, such as covering 10-90% of the blade lateral part, which perforations are preferably evenly distributed over a major part of said blade lateral part. The perforations are present to stir and agitate the water to force the carbon dioxide out therefrom. Additionally, the water is aerated, thereby increasing the oxygen level in the water. Each perforation preferably has a diameter within the range of 2-20 mm, more preferably within the range of 5-15 mm, and even more preferably within the range of 5-10 mm. Such perforations perform the best stirring and agitation of the water.

Each blade may comprise a blade root and a blade tip, where the blade root is fastened to the shaft. Preferably, the blade tip may be fastened to a tubular member adapted for rotating freely within said tubular structure. This configuration stabilizes the blades against the water pressure, especially if the blades are made from a polymeric material or a thin metal plate. Preferably, the tubular member comprises perforated walls, said perforations preferably evenly distributed over a major part of said tubular member. Each perforation preferably has a diameter within the range of 2-20 mm, more preferably within the range of 5-15 mm, and even more preferably within the range of 5-10 mm. Such perforations perform the best stirring and agitation of the water. The tubular structure may preferably be longer than the width of the blades, thereby avoiding that the water level can prevent the blades from rotating.

The role of the suspension is for supporting the shaft with blades within the tubular structure. Obviously, its structure may have many different configurations. In some embodiments, the suspension comprises two parts, a first part supporting the first end of the shaft, and a second part supporting the other end of the shaft. The first and/or the second parts may comprise a rotary bearing. In general, the suspension may be fastened to the tubular structure or may even form part of the tubular structure. The suspension or the tubular structure may preferably be configured to define a plurality of water inlets, and wherein each water inlet is adapted for directing water into a respective blade.

Advantageously, the water inlet may generally be adapted for directing water to the central blade part of each of said blades.

A second aspect relates to an aquaculture system comprising:
one or more water filled tanks or ponds adapted for holding fish and/or other aquatic life species;
one or more water inlets leading water into said tanks or ponds;
one or more water outlets leading water out of said tanks or ponds; and
one or more degassing devices according to the present invention.

In one or more embodiments, the one or more degassing devices are positioned in a water tank in water communication with said one or more water outlets.

A third aspect relates to a method of using one or more degassing devices according to the present invention for removing carbon dioxide from the water of an aquaculture system, preferably a recirculating aquaculture system. In the present context, the term "recirculating aquaculture system" is to be understood as including any aquaculture system recirculation all or a part, such as 1-99%, of its water back into the tanks or ponds.

As used in the specification and the appended claims, the singular forms "a", "an", and "the" include plural referents unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

It should be noted that embodiments and features described in the context of one of the aspects of the present invention also apply to the other aspects of the invention.

DETAILED DESCRIPTION OF THE INVENTION

Figure 1:
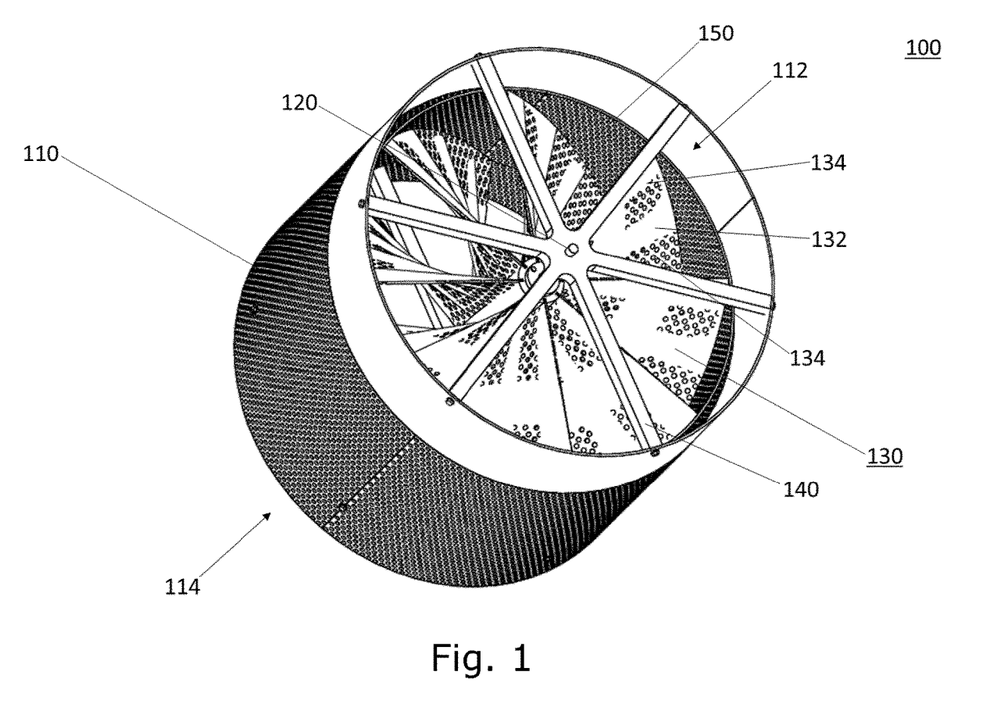
FIG. 1 shows a perspective view of a degassing device according to various embodiments of the present invention.

The following description is to be seen as an example of a degassing device 100 according to various embodiments of the present invention as shown for instance in FIG. 1. The degassing device 100 comprises a tubular structure 110, an elongate shaft 120 holding a plurality of blades 130, a suspension 140 adapted for supporting said shaft 120 within said tubular structure 110.

Figure 4:
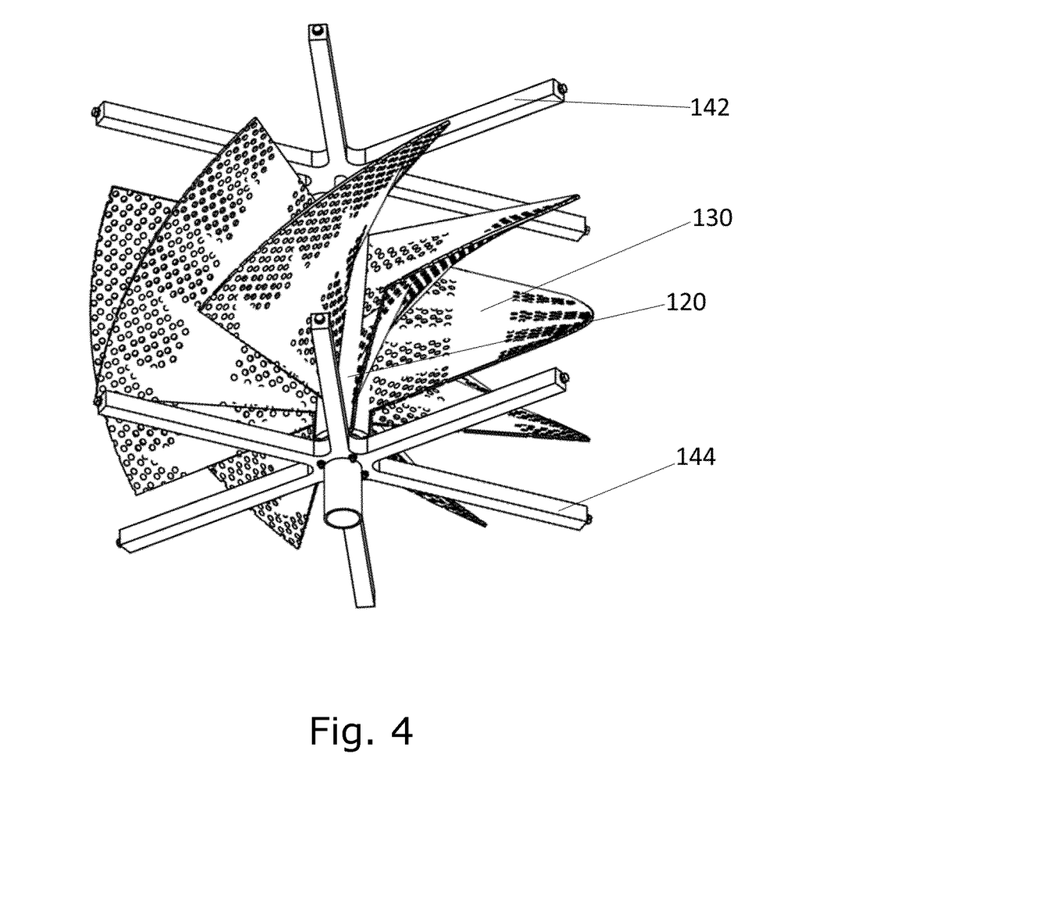
FIG. 4 shows a perspective view of a degassing device according to various embodiments of the present invention, where the tubular structure and tubular member have been removed.

The tubular structure 110 comprises perforated walls, a water inlet 112, and a water outlet 114. The tubular structure 110 is preferably adapted for upright positioning, although horizontal positioning is also possible. When receiving a stream of water falling vertically through the inlet 112, the blades 130 are activated by hydropower. However, in general, the rotation of the shaft and blades may also be performed with other means, such as via a chain drive or the like, coupled to the shaft and driven by a motor. Such an embodiment could also be used in combination with hydropower. The plurality of blades 130, here exemplified by eight blades, are each twisted about a central longitudinal axis of the shaft 120. In this example, the blades are twisted 45 degrees around the shaft 120 (better seen in FIG. 4), which make them particularly effective in converting the gravitational and kinetic energy of the water into rotational energy. The rotational energy in itself is not particularly interesting as the degassing device is not a water turbine. However, the rotational energy is used to stir and agitate the water to release the carbon dioxide gas from the water, thereby making the water suitable for recirculating back into an aquaculture system or for leading out to a stream, a river, an ocean, a lake, or the like.

Figure 2:
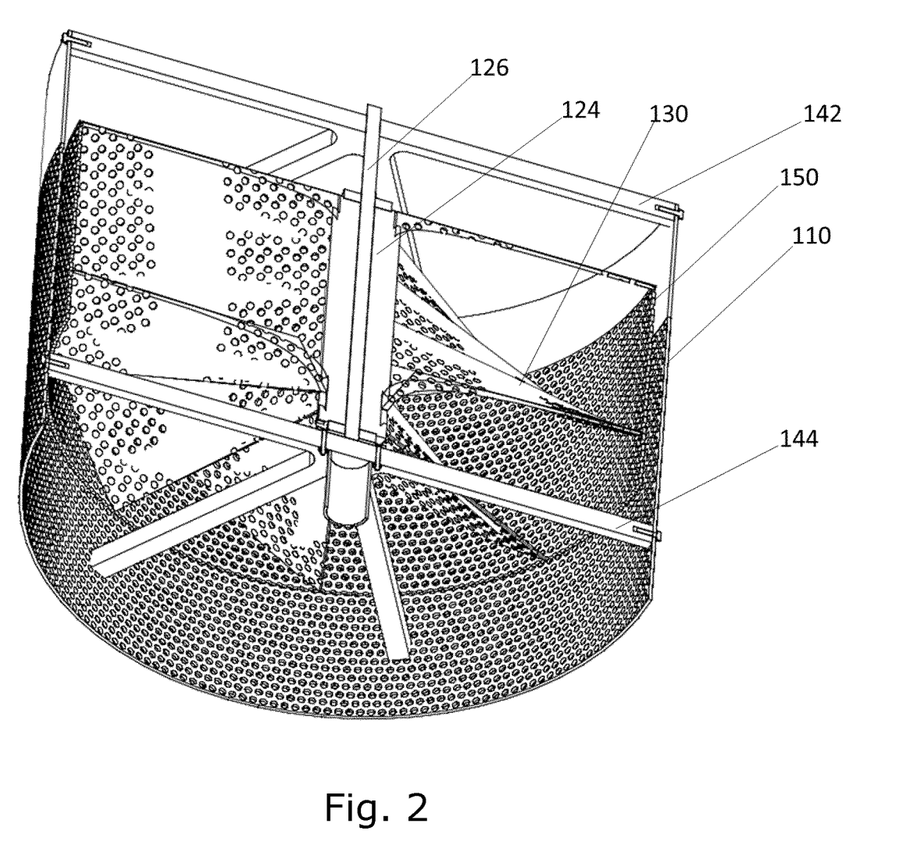
FIG. 2 shows a cross-sectional view of a degassing device according to various embodiments of the present invention.
Figure 3:
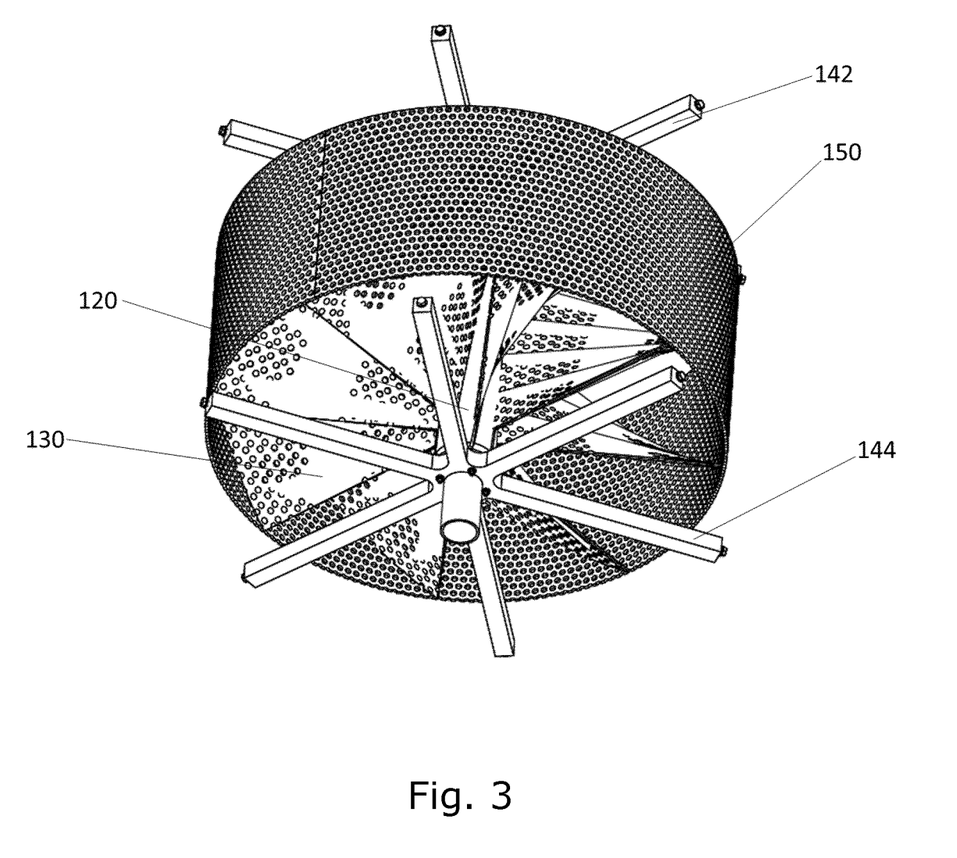
FIG. 3 shows a perspective view of a degassing device according to various embodiments of the present invention, where the tubular structure has been removed.
Figure 5:
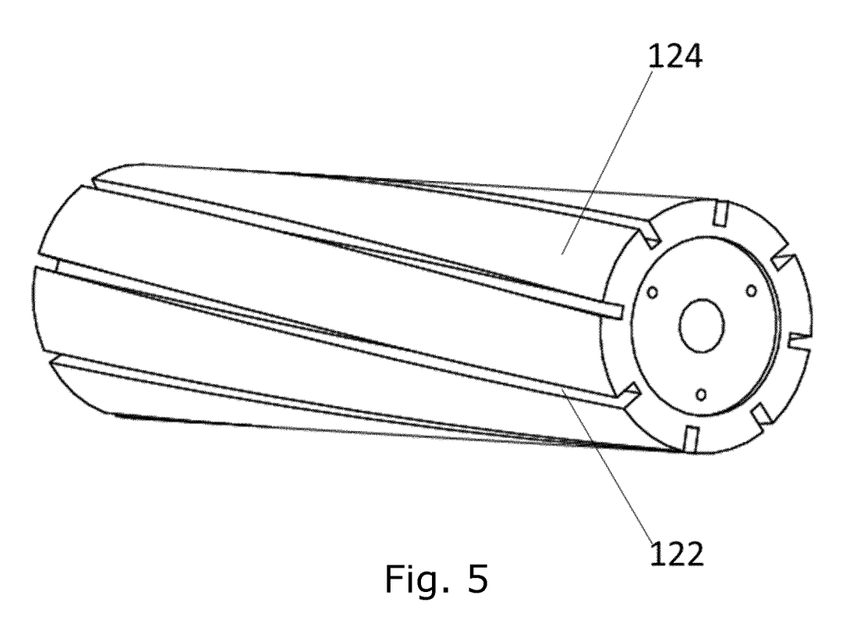
FIG. 5 shows a perspective view of a middle part of a shaft according to various embodiments of the present invention.
Figure 6:
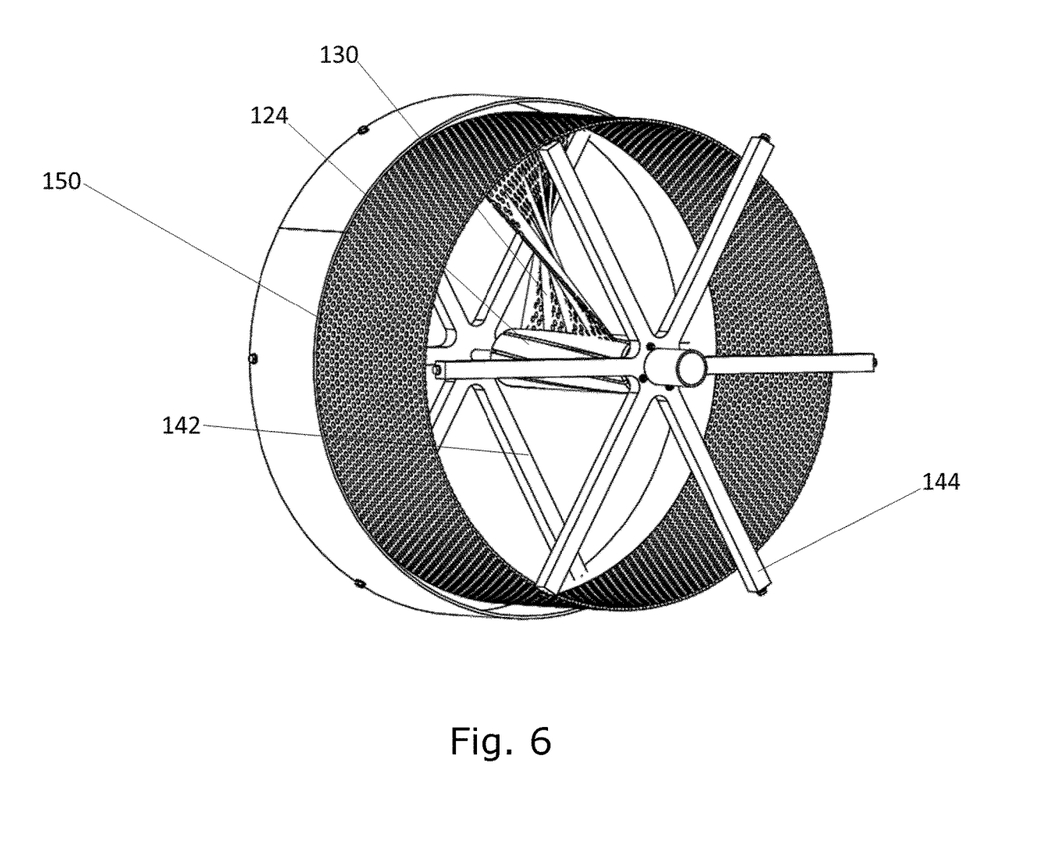
FIG. 6 shows a perspective view of a degassing device according to various embodiments of the present invention, where the tubular member and most of the blades have been removed.

FIG. 2 is a cross-sectional view of the degassing device of FIG. 1. Here, it may be seen that the shaft 120 comprises a middle part 124 and a rod 126 extending through the middle part 124. The function of the rod 126 is to support the middle part 124 and to connect to the suspension 140, thereby securing that the blades 130 can rotate. The rod 126 is positioned within the tubular structure 110 and extends between the inlet 112 and the outlet 114. The middle part 124 is shown in FIG. 5. In order to aid in twisting the blades 130, the middle part may comprise recesses 122 functioning as a guide during the production. FIG. 3 shows a perspective view of a degassing device 100 according to various embodiments of the present invention, where the tubular structure 110 has been removed to better view a specific embodiment of a blade construction. Here, each blade 130 comprises a blade root fastened to the middle part 124 of the shaft 110, and a blade tip is fastened to a tubular member 150. The tubular member 150 is adapted for rotating freely within the tubular structure 110, and is here shown with perforated walls, evenly distributed over the entire tubular member 150. FIG. 6 shows a perspective view of a degassing device according to various embodiments of the present invention, where the tubular structure 110 and most of the blades have been removed to better show the tubular member 150 in relation to a blade 130, and the middle part 124 of the shaft 120.

Figure 7:
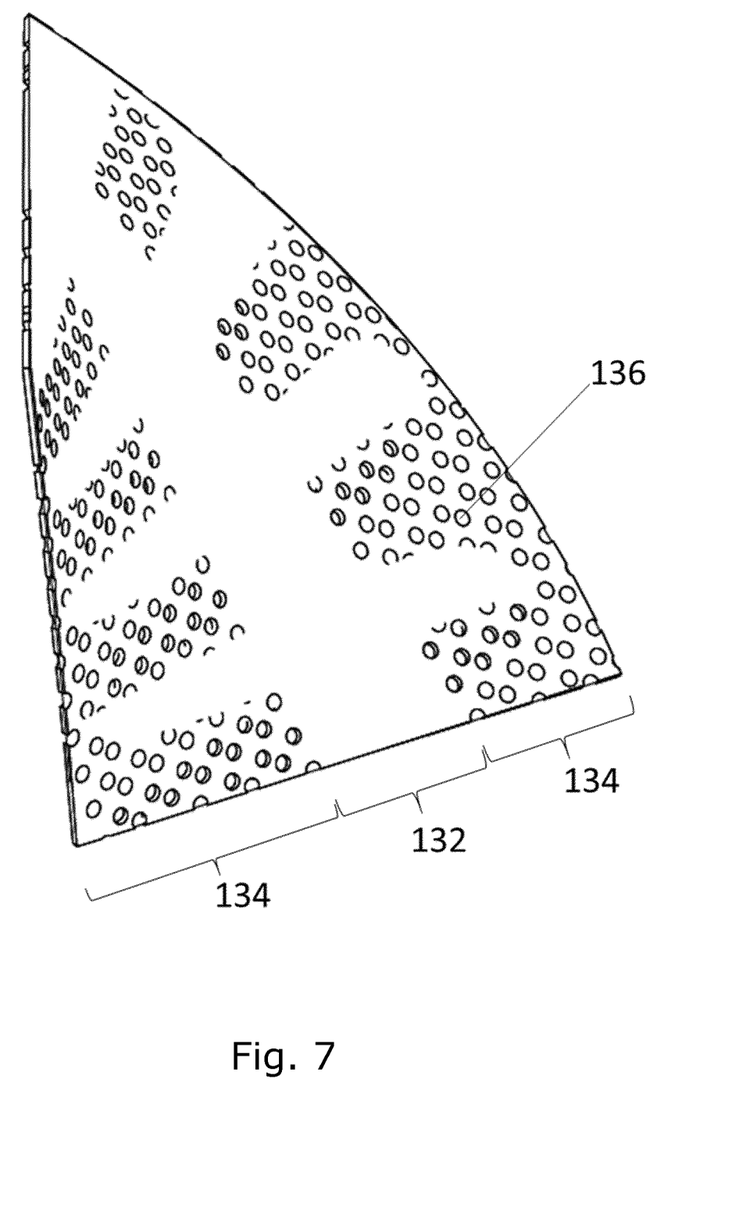
FIG. 7 shows a perspective view of a blade according to various embodiments of the present invention.
Figure 8:
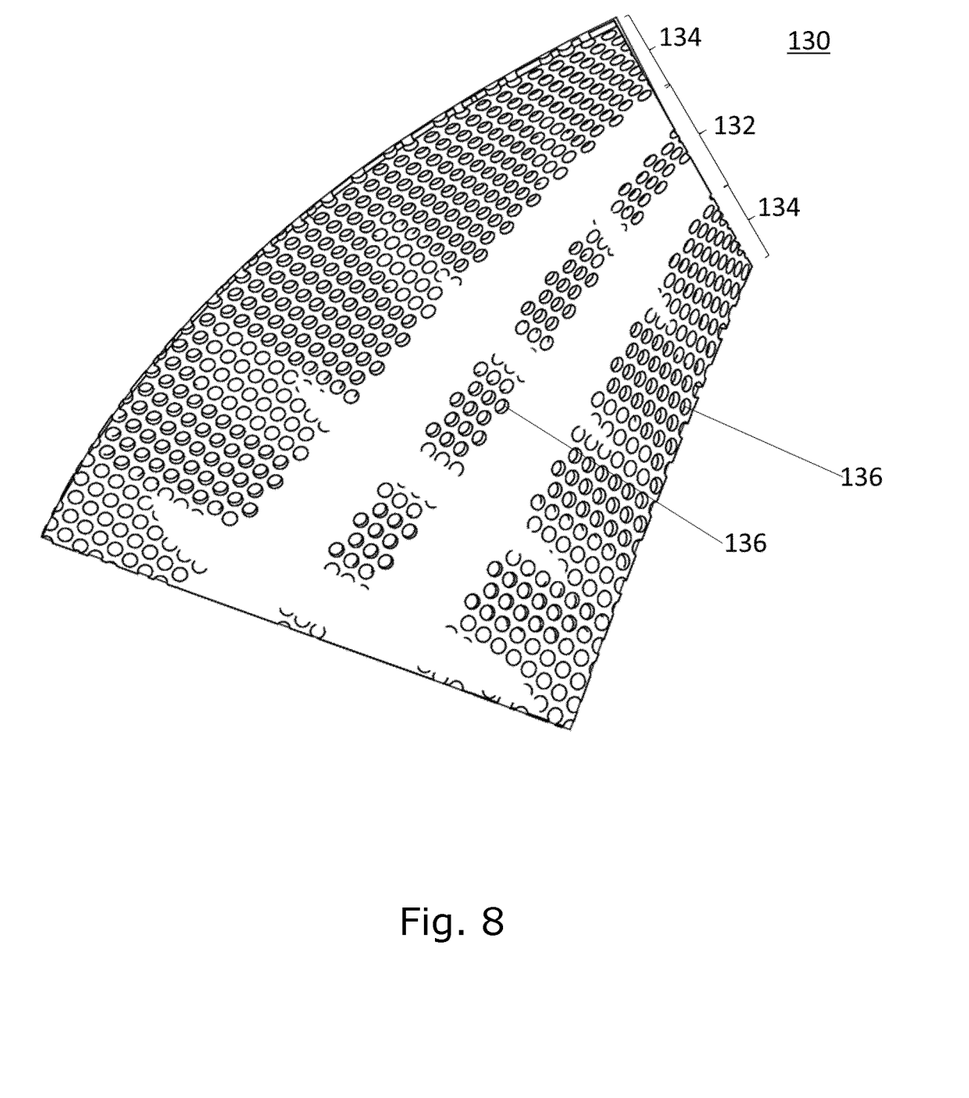
FIG. 8 shows a perspective view of a blade according to various embodiments of the present invention.

In general, each of the blades 130 comprises a central part 132 and two lateral parts 134, each flanking said central part 132. The central part 132 is substantially free from perforations, while the lateral parts 134 are perforated with multiple perforations 136. Two examples of blades 130 are shown in FIGS. 7 and 8. In FIG. 7, the central part 132 is completely free from perforations, while in FIG. 8, the central part 132 comprises one stripe with perforations, and two stripes without perforations.

REFERENCES

100 Degassing device
110 Tubular structure
112 Inlet
114 Outlet
120 Shaft
122 Recess
124 Middle part
126 Rod
130 Blade
132 Central part
134 Lateral part
136 Perforation
140 Suspension
142 First part of the suspension
144 Second part of the suspension
150 Tubular member

The invention claimed is:

1. A degassing device (100) for releasing carbon dioxide from a stream of water, said device (100) comprising:
- a tubular structure (110) comprising a water inlet (112), and a water outlet (114);
- an elongate shaft (120) holding a plurality of blades (130) twisted about a central longitudinal axis of said shaft (120); said shaft (120) positioned within said tubular structure (110) and between said inlet (112) and said outlet (114);

wherein said degassing device (100) further comprises:
- a suspension (140) for supporting said shaft (120) within said tubular structure (110):
- wherein said shaft (120) is rotatably connected to said suspension (140);

wherein each of said blades (130) comprises a central part (132) and two lateral parts (134), each lateral part flanking said central part (132); wherein a major part of said central part (132) is substantially free from perforations, and wherein said two lateral parts (134) are perforated with multiple blade perforations (136), said blade perforations (136) evenly distributed over a major part of each of said two lateral parts (134).

2. The degassing device (100) according to claim 1, wherein each blade perforation of said blade perforations (136) has a diameter of within the range of 2-20 mm.

3. The degassing device (100) according to claim 1, wherein said tubular structure (110) comprises perforated walls having tubular structure wall perforations preferably evenly distributed over a major part of said tubular structure (110), each tubular structure wall perforation having a diameter of within the range of 2-20 mm.

4. The degassing device (100) according to claim 1, wherein each blade (130) comprises a blade root and a blade tip; wherein said blade root is fastened to said elongate shaft (120) and said blade tip is fastened to a tubular member (150) adapted for rotating freely within said tubular structure (110).

5. The degassing device (100) according to claim 4, wherein said tubular member (150) comprises tubular member wall perforations evenly distributed over a major part of said tubular member (150), each tubular member wall perforation having a diameter of within the range of 2-20 mm.

6. The degassing device (100) according to claim 1, wherein said water inlet (112) is configured for directing water to the central part (132) of each of said blades (130).

7. The degassing device (100) according to claim 1, wherein said suspension (140) is configured to define a plurality of water inlets (112), and wherein each water inlet (112) is configured for directing water onto a respective blade (130).

8. An aquaculture system comprising:
- one or more water filled tanks or ponds adapted for holding fish and/or other aquatic life species;
- one or more water inlets leading water into said tanks or ponds;
- one or more water outlets leading water out of said tanks or ponds; and
- one or more degassing devices (100) according to claim 1.

9. The aquaculture system according to claim 8, wherein one or more degassing devices (100) are positioned in a water tank in water communication with said one or more water outlets.

10. Method of using an aquaculture system, comprising:
- recirculating a stream of water in the aquaculture system, and
- using one or more degassing devices (100) according to claim 1 for removing carbon dioxide from the stream of water in the aquaculture system.

* * * * *